US012311881B2

(12) United States Patent
Hassani et al.

(10) Patent No.: US 12,311,881 B2
(45) Date of Patent: May 27, 2025

(54) REMOTE VEHICLE MOTIVE CONTROL WITH OPTIMIZED MOBILE DEVICE LOCALIZATION

(71) Applicant: Ford Global Technologies, LLC, Dearborn, MI (US)

(72) Inventors: Ali Hassani, Ann Arbor, MI (US); Vivekanandh Elangovan, Canton, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 412 days.

(21) Appl. No.: 18/052,403

(22) Filed: Nov. 3, 2022

(65) Prior Publication Data

US 2023/0090051 A1  Mar. 23, 2023

Related U.S. Application Data

(63) Continuation-in-part of application No. 17/090,725, filed on Nov. 5, 2020, now Pat. No. 11,535,196.

(51) Int. Cl.
*H04W 4/021* (2018.01)
*B60R 25/24* (2013.01)

(52) U.S. Cl.
CPC .......... *B60R 25/245* (2013.01); *H04W 4/021* (2013.01); *B60R 2325/205* (2013.01)

(58) Field of Classification Search
CPC . B60R 25/245; B60R 2325/205; H04W 4/021
USPC .......................................................... 455/99
See application file for complete search history.

(56) References Cited

U.S. PATENT DOCUMENTS

| 10,172,145 | B2 * | 1/2019 | Hazebrouck | ...... H04M 1/72415 |
| 10,244,476 | B2 * | 3/2019 | Elangovan | ............ H04W 4/023 |
| 10,412,546 | B2 * | 9/2019 | Golgiri | .................. H04B 7/043 |
| 10,609,425 | B1 * | 3/2020 | Harvey | .............. H04N 21/4117 |
| 11,345,312 | B1 * | 5/2022 | Harris | ..................... H04B 11/00 |
| 11,345,313 | B2 * | 5/2022 | Schubert | ............. B60R 25/2018 |
| 2009/0298429 | A1 * | 12/2009 | Nakagawa | ........ H04M 1/72412 |
|  |  |  |  | 455/41.2 |
| 2013/0237193 | A1 * | 9/2013 | Dumas | ............... G07C 9/00309 |
|  |  |  |  | 455/414.1 |

(Continued)

OTHER PUBLICATIONS

Texas Instruments "Phone as a Key (PAAK)" (Oct. 2019).

*Primary Examiner* — April G Gonzales
(74) *Attorney, Agent, or Firm* — Frank Lollo; Eversheds Sutherland (US) LLP (57) ABSTRACT

A device localization system for a vehicle and a mobile device configured as a Phone-as-a-Key (PaaK) is described. The system includes a fob-free mode for performing remote control vehicle features using a selective mobile device localization technique that reduces motive functionality of the vehicle, based location of a user performing the vehicle control during the remote-control operation. The system determines a geographic position of a user using a single Bluetooth® Low Energy (BLE) antenna, and establishes establish a high-fidelity zone based on a change in mobile device position. The system reduces a motive functionality of the vehicle, based on the selective mobile device localization, from a first motive mode having a full motive functionality to a second motive mode responsive to determining that the mobile device is not present in the high-fidelity zone.

20 Claims, 7 Drawing Sheets

(56) References Cited

U.S. PATENT DOCUMENTS

| | | | | |
|---|---|---|---|---|
| 2014/0357293 | A1* | 12/2014 | Tsaur | H04W 4/023 |
| | | | | 455/456.1 |
| 2015/0028995 | A1* | 1/2015 | Gautama | G06F 1/3215 |
| | | | | 340/5.72 |
| 2015/0048927 | A1* | 2/2015 | Simmons | G07C 9/00309 |
| | | | | 340/5.61 |
| 2015/0161834 | A1* | 6/2015 | Spahl | H04W 52/02 |
| | | | | 340/5.61 |
| 2015/0178532 | A1* | 6/2015 | Brule | G06Q 20/321 |
| | | | | 705/41 |
| 2015/0287257 | A1* | 10/2015 | Thompson | G07C 9/00896 |
| | | | | 340/5.72 |
| 2016/0063459 | A1* | 3/2016 | Li | H04W 4/44 |
| | | | | 705/39 |
| 2016/0318475 | A1* | 11/2016 | Honkanen | B60R 25/01 |
| 2016/0343187 | A1* | 11/2016 | Trani | H04W 4/021 |
| 2017/0064517 | A1* | 3/2017 | Lee | G01S 7/282 |
| 2017/0105101 | A1* | 4/2017 | Santavicca | H04B 17/318 |
| 2018/0302859 | A1* | 10/2018 | Elangovan | H04W 4/40 |

\* cited by examiner

REMOTE VEHICLE MOTIVE CONTROL WITH OPTIMIZED MOBILE DEVICE LOCALIZATION

CROSS-REFERENCE TO RELATED PATENT APPLICATION

The present application is related to and claims priority from Non-Provisional application Ser. No. 17/090,725 filed on Nov. 5, 2020 titled "REMOTE VEHICLE MOTIVE CONTROL WITH OPTIMIZED MOBILE DEVICE LOCALIZATION."

BACKGROUND

Remote Park Assist (RePA) systems utilize a combination of a user device (such as a smartphone) and remote cloud server technologies to deliver user commands to a RePA-enabled vehicle, and a key fob to localize the user with respect to vehicle skin. In some consumer markets, the user is required to be within 6 meters of the vehicle skin when delivering vehicle control commands from a remote location for performing remote operations, such as vehicle parking, for example. RePA systems are sometimes used in vehicles having Level-2 autonomous vehicle driving features configured with a limited perception system, whereby the user is expected be ready to take over motive control if necessary. In the case of remote motive control of Level-2 autonomous vehicles, this means the user should be both at a line of sight vantage point and within an appropriate distance to make an informed decision each time an undetected obstacle (such as small animal) enters the vehicle's path.

It may be convenient for the user to omit the fob and carry only a mobile device (in some cases, a "mobile device" may refer to a smartphone or a keyfob). However, Bluetooth® localization may, at times, lack the precision necessary to determine user location relative to the vehicle in certain scenarios. In other aspects, moving the localization task from the fob system to the mobile device may carry a significant computational load for the Smartphone CPU and the Bluetooth® Low Energy (BLE) module of the mobile device and/or the vehicle.

U.S. Pat. No. 10,244,476 B2 (hereafter "the '476 publication"), assigned to Ford Global Technologies LLC, and incorporated herein by reference, discloses a method for reducing power consumption in a Phone-as-a-Key (PaaK) vehicle system. The vehicle disclosed in the '476 publication includes a main BLE Module (BLEM) antenna and several BLE Antenna Modules (BLEAMs). The BLEAMs disclosed in the '476 publication may allow for localization, signal strength detection and monitoring, and/or other functions that can be used by PaaK systems. To reduce power consumption, the BLEAMs are switched off when the smart phone is not within range of the car (i.e., a user is away from the car). When the user approaches the car and makes a connection with a main BLE module, the BLEAMs are powered on.

U.S. Pat. No. 10,172,145 B2 (hereafter "the '145 publication") assigned to Ford Global Technologies LLC, and incorporated herein by reference, discloses a PaaK localization system that includes several wireless nodes positioned around and inside the vehicle for detecting mobile device Received Signal Strength Indication (RSSI) values. RSSI values reflect the strength of communication signals between the mobile device and the vehicle. The RSSI values are used to determine the mobile device's radial distance from the vehicle. The system includes multiple RSSI thresholds that trigger certain actions. As disclosed in the '145 publication, once it is determined that the mobile device is within the first threshold, welcome lights of the vehicle will turn on.

Prior systems such as those disclosed in the '145 publication and the '476 publication may reduce power consumption in various ways, such as switching on and off BLEAMs. It may be advantageous to provide initial high-fidelity starting points that may be used to transition to low-fidelity PaaK tracking to increase convenience for users by using a PaaK without the fob, while maintaining or increasing vehicle security.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods disclosed herein are directed to a device localization system for a vehicle and mobile device PaaK system. The mobile device localization system is configured for improving user localization, and more particularly, mobile device localization, during a RePA operation, without the use of a fob.

The present disclosure can utilize an initial high-fidelity starting point, followed by a lower fidelity measurement, over time, to reduce computational load on a PaaK vehicle system while localizing the mobile device with respect to the vehicle. The mobile device localization system measures a high-fidelity starting point when in a non-motive state, where the vehicle is keyed-on and running but vehicle is static. The mobile device localization system then makes a low fidelity distance measurement via a single BLEM antenna.

In some embodiments, the mobile device localization system measures a change in received signal strength and/or angle of arrival and/or time of flight and/or phase of the signal to estimate the BLEM change in distance. In other aspects, the mobile device localization system may gain additional measurement precision by incorporating a measurement of vehicle motion. The disclosed system uses low fidelity tracking until a significant jump in position is detected, until the vehicle is not actively motive, or until a time/displacement threshold has been met and then continues distance measurements until a new high-fidelity starting point is obtained. Additionally, the mobile device localization system may reduce motive mode during low fidelity tracking, by triggering secondary actions that can include decreasing speed, travel distance, parking slot selection, run time, reducing controlling options by geo-fencing the operation to trusted zones, or requiring a local blue zone where the driver has previously mapped the parking lot.

Embodiments of the present disclosure may reduce computational resources needed to localize a mobile device to a vehicle within a threshold of accuracy needed to maintain motive control of the vehicle using the localized mobile device.

These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

Figure 1A:
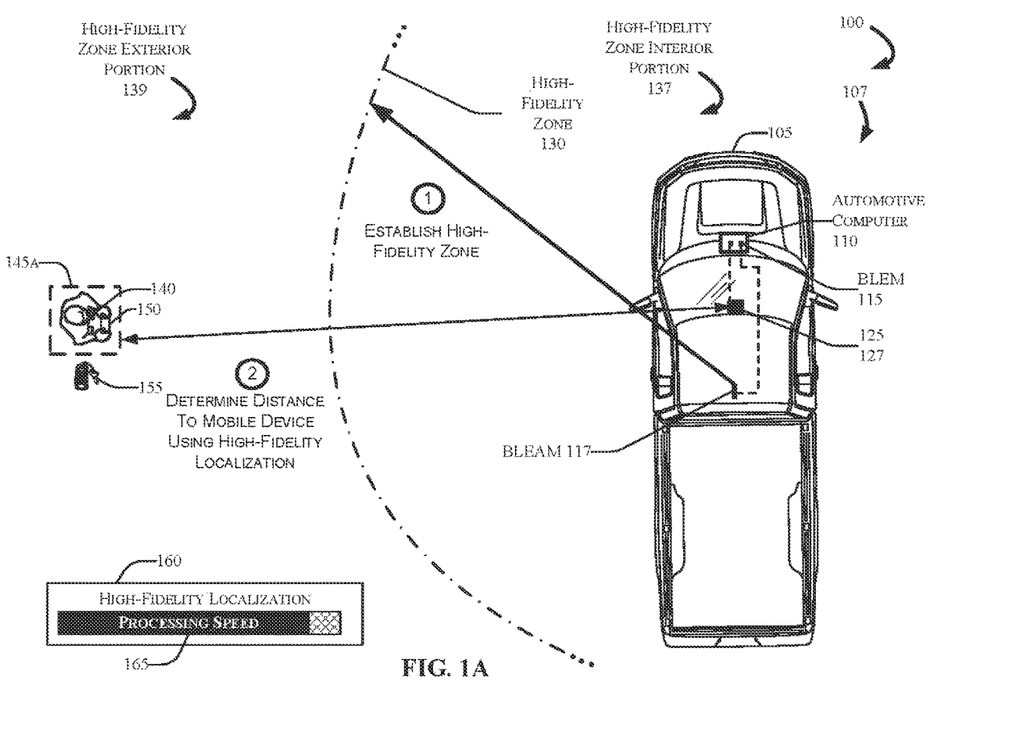
FIGS. 1A and 1B depict an example computing environment in which techniques and structures for providing the systems and methods disclosed herein may be implemented.
Figure 1B:
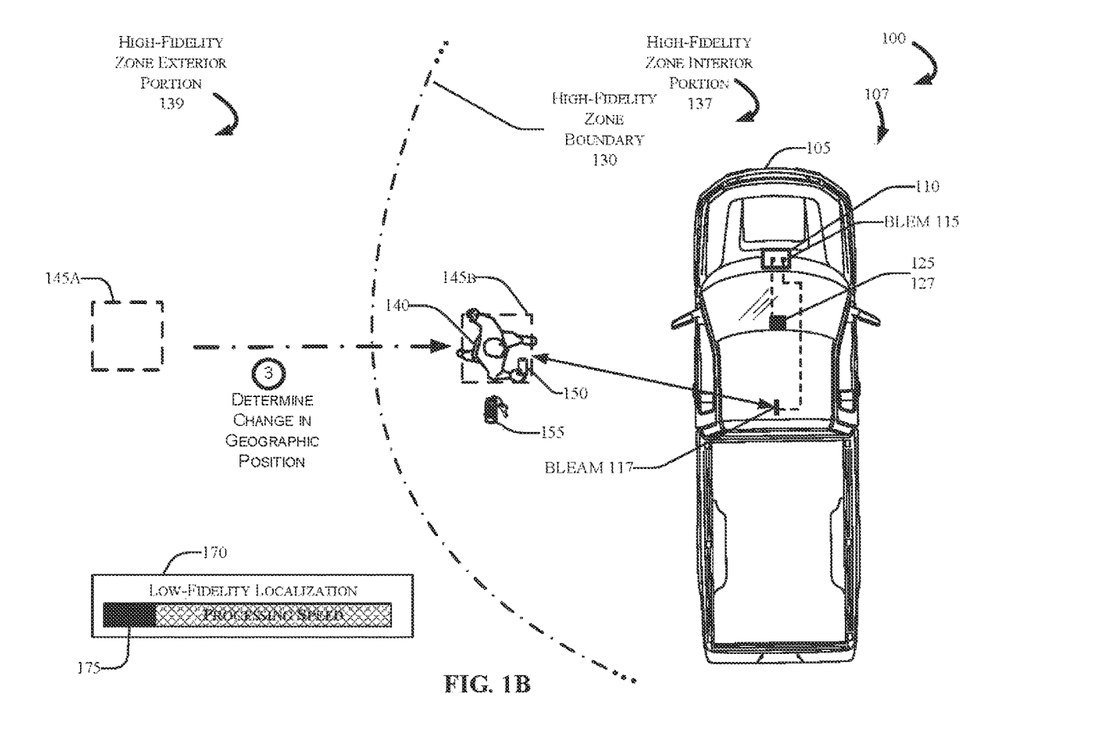

FIGS. 1A and 1B depict an example computing environment 100 in which techniques and structures for providing the systems and methods disclosed herein may be implemented. With reference to FIG. 1A, the computing environment 100 depicts a vehicle 105 configured with a mobile device localization system 107. The mobile device localization system 107 may implement a fob-free mode for remote control features that do selective phone localization of a mobile device 150 and reduce motive functionality of the vehicle 105. Embodiments of the present disclosure may increase usability of a PaaK system onboard the vehicle 105, to achieving operational and safety requirements. Selective phone localization, as used herein, may describe a process where the vehicle 105 only optimally switches between full PaaK localization using single-antenna BLEM ranging to reduce computation load for the automotive computer 110 and the mobile device 150. While reference herein may be made to the usage of a BLEM, the systems and methods described herein may similarly apply to any other type of system as well (for example, a system that uses Ultra Wide-Band (UWB) transceivers or "anchors").

While the principle embodiment is described with reference to a single-antenna BLEM, other low-energy protocols including, for example, Bluetooth®, BLE, UWB, WiFi or Near Field Communication (NFC) may be used.

As used herein, motive functionalities can include vehicle self-driving characteristics such as vehicle speed, travel distance, autonomous run time, and/or other functionalities related to self-driving features of the vehicle 105. A functionality is reduced as compared to (a second motive mode) available/configured self-driving functionalities of a first motive mode (having a full motive functionality) as compared to a second motive mode having fewer functionalities than the first motive mode. Motive modes are discussed in greater detail with respect to FIG. 3.

According to disclosed embodiments, the mobile device localization system 107 may increase or decrease motive control options available for user 140 control when a fob 155 is not present. In all cases, the system 107 may restore the first motive functionality(ies) and provide full or nearly-full vehicle control once a key fob (e.g., the fob 155, or equivalent localization device) is detected within an operational range (e.g., a high-fidelity zone 130) of the vehicle 105 during a subsequent remote parking assistance event.

Operational range is described herein as a bounded imaginary circle or ovoid bounding the high-fidelity zone 130, which forms a boundary that the vehicle 105 lies at an approximate center of a high-fidelity zone interior portion 137. The high-fidelity zone 130 may surround the vehicle 105 at an approximate 5 m radius from the BLEAM 117. Other distances are possible, such as, for example, 10 m, 20 m, one-half external to the interior portion 137 in the high-fidelity zone exterior portion 139.

The mobile device localization system 107 can include an automotive computer 110 disposed onboard the vehicle 105. The automotive computer 110 may communicate with and/or include a low-fidelity BLEM 115 disposed in communication with a Bluetooth® low-energy antenna module (BLEAM) 117. It should be appreciated that, although depicted on the vehicle roof, the BLEAM may be disposed anywhere on the vehicle 105, and/or be incorporated into one or more vehicle components (e.g., a bumper, automotive glass, plastic molding, etc.).

The BLEAM 117 is a single antenna module that is computationally light as compared to computational cost associated with a high-fidelity Phone-as-a-Key (PaaK) location system 125 (hereafter "PaaK system 125"). The PaaK system 125 may provide Passive Entry Passive Start (PEPS) features for users that wish to utilize their mobile device or a Bio signature in place of a PEPS fob 155, thereby generating a precise measurement of the user 140 and increasing confidence that the requesting PEPS device is authorized for vehicle entry and operation.

The PaaK system 125 may also be used for, among other uses, providing location information associated with the user 140 and/or the mobile device 150 when the user 140/mobile device 150 are proximate the vehicle 105. In some aspects, detecting user location with respect to the vehicle 105 using the PaaK system 125 may be advantageous when a relatively higher precision of location is desired as compared to a lower-fidelity location available using the BLEAM 117 and BLEM 115. As demonstrated by the High-Fidelity Localization graph 160, one disadvantage of using the PaaK system 125 exclusively for performing localization may be the computational cost associated with higher processing speeds. By repeatedly tracking the user's change in position, over time, while the autonomous vehicle is performing RePA operations, the relatively fast processing speed and computationally-intense calculations associated with the locating operation may exceed allowable capacity for the vehicle systems and/or the BLE chip (not shown in FIG. 1) associated with the mobile device 150. Accordingly, it may be advantageous to perform an initial distance determination that determines a distance to the mobile device and/or user 140 using the high-fidelity localization (shown as step 2 in FIG. 1A).

Selective localization leverages the concept of a high-fidelity starting point (e.g., the high-fidelity starting point 145A that identifies user location with respect to the vehicle 105, then tracks the user location with a lower-fidelity measurement, over time, to reduce computational load on both the automotive computer 145 and the mobile device 150).

As shown in FIG. 1, a first step may include defining a geo-fence perimeter (e.g., the high-fidelity zone 130) surrounding the vehicle 105 that defines an interior portion 137 of the high-fidelity zone. At step 2, the high-fidelity PaaK localization system 125 may measure the high-fidelity starting point 145A (e.g., the starting position of the user 140) when the vehicle 105 is in a non-motive state (i.e., where the vehicle 105 is in a key-on mode but is static). One example of a non-motive state can include the user 140 navigating the mobile device application unlock screen and/or parking selection screens on the mobile device 150. This shall be considered a high-fidelity fixed point from which the vehicle 105 (and more particularly, the low-fidelity BLEM 115) can track user position.

FIG. 1B depicts another view of the computing environment 100, where the user changes position from a first position (e.g., the high-fidelity starting point 145A) to a second position 145B. At step 3, position tracking over time may then be done with the single antenna BLEAM 117 to reduce computational load. In a method similar to dead reckoning, the automotive computer 110 may determine a change in received signal strength, angle of signal arrival/departure, phase of the signal, and/or time of flight. The BLEM 115 may then estimate a change in distance between the BLEAM 117 and the user 140 (though not necessarily actual location). In other aspects, extra precision may be gained by taking the vehicle's motion into account in addition to the change in position measurements/estimation performed by the BLEM 115.

This position translation estimation process shall continue until either a significant jump in position is suspected (e.g., the BLEAM 117 detects a relatively large change in angle of signal arrival/departure, phase of signal, or received single strength or time of flight drops below a threshold), until the vehicle 105 is not actively motive (e.g., the vehicle 105 has entered a pause state and is not moving), or a time/total displacement threshold has been met (e.g., the user 140 has moved too great a distance for the change in distance measurement at step 3 to be sufficiently accurate). Under any one or more of these conditions, a new high-fidelity starting point must be acquired using the high-fidelity PaaK localization system 125 (e.g., by returning to Step 2 (FIG. 1A)).

In one embodiment, the mobile device localization system 107 may verify perceived user location to achieve greater confidence. For example, the automotive computer 110 may estimate or predict a user location to be in a location with a 5-meter error bound by determining a user walking direction and speed of travel. The low-fidelity BLEM 115 may use an ultrasonic and radar imaging system (e.g., proximity sensors 127) to search for a large object in that general area. If a large object is found, there may be an increased and sufficient probability that the large object is the user arriving at the predicted position.

Responsive to determining that no large object is observed, the low-fidelity BLEM 115 may return to step 2 (FIG. 1A) to perform a full PaaK localization, to recalculate a new high-fidelity starting position. If multiple objects are found, the vehicle 105 may rely on an assumption that the worst-case value is true. In another aspect, if a vehicle camera associated with an imaging system (see proximity sensors described with respect to FIG. 3) has appropriate field of vision and resolution, the automotive computer 110 may perform object detection using the proximity sensors 127 to determine which is the remote controller (e.g., the user 140).

Fob-free localization processes may increase system efficiency by reducing the processing speed 175 needed to perform low-fidelity localization 170. This lower-resolution process may be inherently less precise as compared to the high-fidelity PaaK localization. In one embodiment, the system 107 may reduce the vehicle control options to maintain operational requirements. Accordingly, the mobile device localization system 107 may reduce a motive functionality of the vehicle 105 from a first motive mode having a full motive functionality to a second motive mode having a reduced motive functionality, responsive to determining that the mobile device 150 is not present in the high-fidelity zone interior portion 137.

As one example use case, this reduced motive functionality of the vehicle 105 may apply to a "secure idle" mode. Secure idle may be a production security and convenience feature offered on vehicles that may prevent the gear shifter of the vehicle from being removed from a "park" position when the vehicle is running unless there is a valid passive electronic key inside the cabin. The secure idle feature may be intended to prevent someone other than an authorized driver of the vehicle (for example, a thief or unauthorized driver) from driving away with the vehicle if the authorized driver/owner leaves the vehicle running while the owner temporarily leaves the vehicle cabin with the passive key. For example, the authorized driver may leave the vehicle running and leave with the device to run back into the house or to quickly step inside a gas station. In the context of motive modes as described herein, if the mobile device 150 is in the cabin of the vehicle 105, a first motive mode having a full motive functionality may be used. If the mobile device 150 is outside the cabin of the vehicle 105 and outside the high-fidelity zone interior portion 137, a second motive mode having a reduced motive functionality may be used. In the case of secure idle, this may involve no motive function outside the cabin and no alerts of a vehicle running with no passive key inside until the user enters the high-fidelity far zone interior portion 139.

Continuing the example of secure idle, the vehicle 105 may provide alerts to a user if it is determined that the vehicle 105 is running but the mobile device 150 is within the high-fidelity zone exterior portion 139. In such scenarios, the vehicle 105 may provide an alert (such as an audible chirp and/or any other type of alert) indicating the vehicle is still running. However, when the user is in the high-fidelity zone interior portion 137 or the interior of the vehicle, the alert may not be provided to the user.

The mobile device localization system 107 may similarly be configured to increase a non-motive functionality of the vehicle 105 from a first non-motive mode having no (or limited) non-motive functionality to a second non-motive mode having increased non-motive functionality, responsive to determining that the mobile device 150 is present in the high-fidelity zone interior portion 137. A non-motive functionality (also referred to herein as a non-motive "state," "feature," etc.) may refer to a state when the vehicle is keyed-on and running but vehicle is static.

This may be applicable to any number of non-motive features associated with the vehicle 105. A first example may include window open and/or close operations. If the mobile device 150 is within the high-fidelity zone interior portion 137, then the windows of the vehicle 105 may be opened and/or closed. Otherwise, the windows may remain unable to be opened and/or closed remotely. A second example may include audio usage. Depending on whether the mobile device 150 is present in the cabin of the vehicle, outside the cabin but in the high-fidelity zone interior portion 137, or outside the high-fidelity zone interior portion 137, the vehicle 105 may limit functionality of the audio system of the vehicle, such as a maximum allowed volume a length of usage, and/or any other functionality. A third example may include charging port usage. Any charging ports of the vehicle may be activated for different times depending on location of the mobile device 150. For example, if other devices are left within the vehicle 105 for charging. A fourth example may include usage of an infotainment system of the vehicle 105. For example, if the mobile device 150 is located outside the cabin of the vehicle 105 but within the high-fidelity zone interior portion 137, then the infotainment system may use the Bluetooth to cellular connection of the mobile device 150. However, if the mobile device 150 is outside the high-fidelity zone interior portion 137 then the infotainment system may switch to Telematics Control Unit (TCU) data (for example, TCU 260) of the vehicle 105. These are merely exemplary non-motive features and any other non-motive features may also be applicable as well.

Additionally, in one or more embodiments, the mobile device localization system 107 may similarly be configured to further increase a non-motive functionality of the vehicle 105 from the second non-motive mode to a third non-motive mode having even further increased non-motive functionality, responsive to determining that the mobile device 150 is present in the cabin (for example, the interior) of the vehicle. The third non-motive mode may have greater non-motive functionality than the first non-motive mode and the second non-motive mode. In some instances, the third non-motive mode may include a maximum amount of non-motive functionality.

Figure 1C:
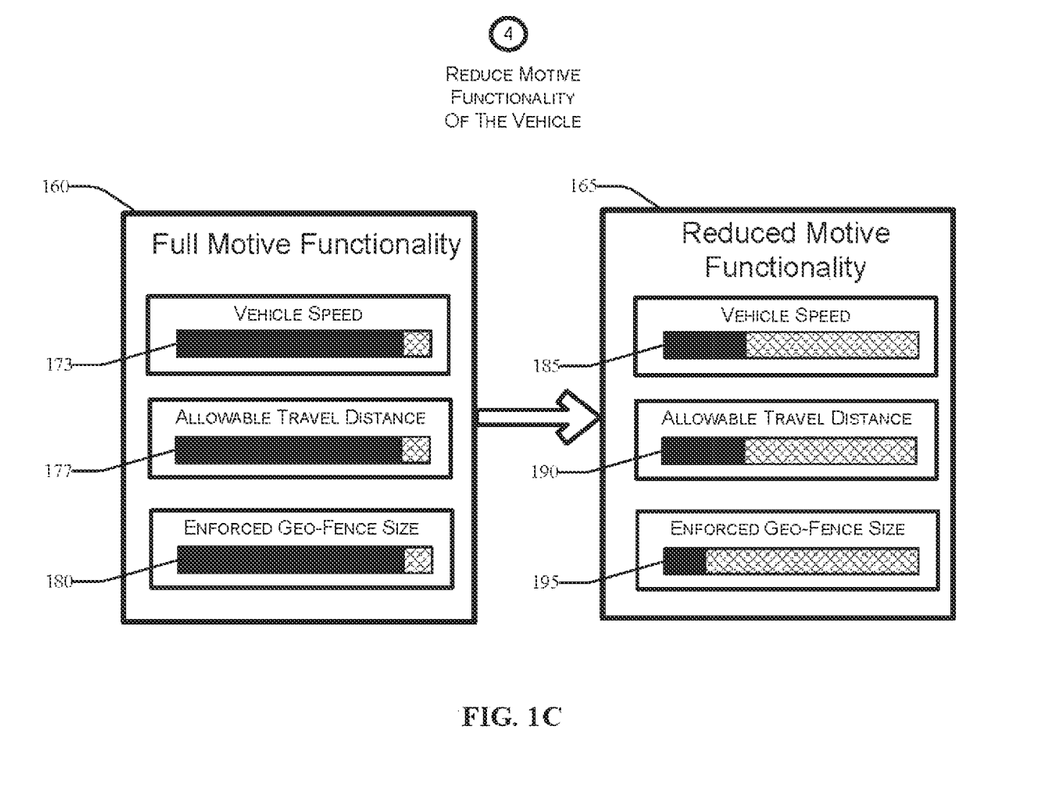
FIG. 1C depicts an example step for reducing motive functionality of the vehicle in accordance with embodiments of the present disclosure.

FIG. 1C depicts an example step 3 for reducing motive functionality from a full motive functionality localization (shown in graph 160) to a reduced motive functionality (shown in graph 165), in accordance with embodiments of the present disclosure. This step includes one or more of decreasing vehicle speed from a full motive functionality vehicle speed 173, to a reduced motive functionality vehicle speed 185. In another example, this step includes reducing allowable travel distance from a full motive functionality allowable travel distance 177, to a reduced motive functionality travel distance 190, and/or reducing an enforced geo-fence size that bounds the allowable area from within which the vehicle 105 may operate using remote motive features from 180 to 195. In other embodiments, the reduced motive functionality may enhance safety by limiting the use of motive functions to those for which prior knowledge is available or those that do not require substantial driving complexity, for example, the motive function reduction may include a decrease in allowable vehicle run time, or other options that are determined to be simpler by the vehicle (i.e. wider parking slot). In other aspects, the system 107 may restrict vehicle travel to trusted zones (e.g., permit free driving to a personal garage), or require travel only within a local blue zone where a driver has previously mapped the parking lot or area.

Figure 2:
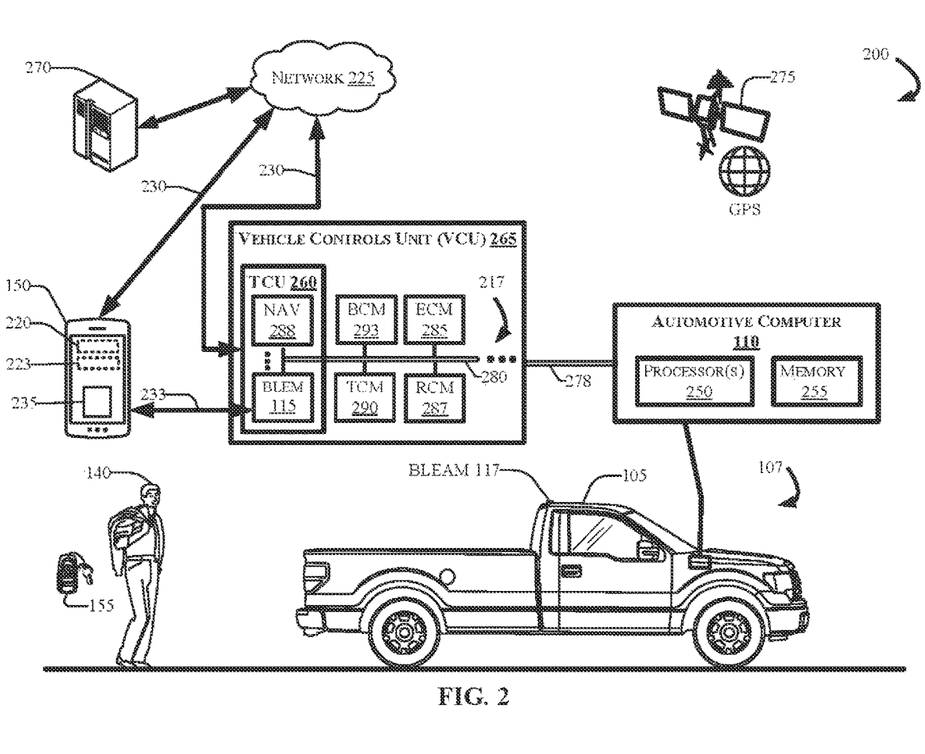
FIG. 2 depicts another aspect of the example computing environment of FIGS. 1A and 1B in which techniques and structures for providing the systems and methods disclosed herein may be implemented.

Now considering vehicle architecture in greater detail, FIG. 2 depicts an example computing environment 200 that can include the vehicle 105 comprising an automotive computer 110, and a Vehicle Controls Unit (VCU) 265 that typically includes a plurality of electronic control units (ECUs) 217 disposed in communication with the automotive computer 110 and a mobile device localization system 107. A mobile device 150, which may be associated with a user 240 and the vehicle 105, may connect with the automotive computer 110 using wired and/or wireless communication protocols and transceivers. The mobile device 150 may be communicatively coupled with the vehicle 105 via one or more network(s) 225, which may communicate via one or more wireless channel(s) 230, and/or may connect with the vehicle 105 directly using near field communication (NFC) protocols, Bluetooth® protocols, Wi-Fi, Ultra-Wide Band (UWB), and other possible data connection and sharing techniques. The vehicle 105 may also receive and/or be in communication with a Global Positioning System (GPS) 275.

The automotive computer 110 may be or include an electronic vehicle controller, having one or more processor(s) 250 and memory 255. The automotive computer 110 may, in some example embodiments, be disposed in communication with the mobile device 150, and one or more server(s) 270. The server(s) 270 may be part of a cloud-based computing infrastructure and may be associated with and/or include a Telematics Service Delivery Network (SDN) that provides digital data services to the vehicle 105 and other vehicles (not shown in FIG. 2) that may be part of a vehicle fleet (not shown in FIG. 2).

Although illustrated as a pickup truck, the vehicle 105 may take the form of another passenger or commercial automobile such as, for example, a car, a sport utility, a crossover vehicle, a van, a minivan, a taxi, a bus, etc., and may be configured to include various types of automotive drive systems. Exemplary drive systems can include various types of internal combustion engine (ICE) powertrains having a gasoline, diesel, or natural gas-powered combustion engine with conventional drive components such as, a transmission, a drive shaft, a differential, etc. In another configuration, the vehicle 105 may be configured as an electric vehicle (EV). More particularly, the vehicle 105 may include a battery EV (BEV) drive system or be configured as a hybrid EV (HEV) having an independent onboard powerplant, a plug-in HEV (PHEV) that includes a HEV powertrain connectable to an external power source, and/or includes a parallel or series hybrid powertrain having a combustion engine powerplant and one or more EV drive systems. HEVs may further include battery and/or supercapacitor banks for power storage, flywheel power storage systems, or other power generation and storage infrastructure. The vehicle 105 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 105 may be a manually driven vehicle, and/or be configured to operate in a fully autonomous (e.g., driverless) mode (e.g., Level-5 autonomy) or in one or more partial autonomy modes. Examples of partial autonomy modes are widely understood in the art as autonomy Levels 1 through 5. An autonomous vehicle (AV) having Level-1 autonomy may include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. Level-3 autonomy in a vehicle can provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level 4 autonomy includes vehicles having high levels of autonomy that can operate independently from a human driver, but still include human controls for override operation. Level-4 automation may also enable a self-driving mode responsive to a predefined conditional trigger, such as a road hazard or a system failure. Level-5 autonomy is associated with autonomous vehicle systems that require no human input for operation, and generally do not include human operational driving controls.

According to embodiments of the present disclosure, the mobile device localization system 107 may be configured to operate with the vehicle 105 having a Level-2 or Level-3 autonomous vehicle controller. An example AV controller 300 is described in greater detail with respect to FIG. 3. Accordingly, the mobile device localization system 107 may provide some aspects of human control to the vehicle 105 when the vehicle includes Level-2 or Level-3 autonomous operation features such as, for example, remote parking assist.

The mobile device 150 can include a memory 223 for storing program instructions associated with an application 235 that, when executed by a mobile device processor 220, performs aspects of disclosed embodiments. The application (or "app") 235 may be part of the mobile device localization system 107 or may provide information to the mobile device localization system 107 and/or receive information from the mobile device localization system 107.

In some aspects, the mobile device 150 may communicate with the vehicle 105 through the one or more channel(s) 230, which may be encrypted and established between the mobile device 150 and a Telematics Control Unit (TCU) 260. The mobile device 150 may communicate with the TCU 260 using a wireless transmitter (not shown in FIG. 2) associated with the TCU 260 on the vehicle 105. The transmitter may communicate with the mobile device 150 using a wireless communication network such as, for example, the one or more network(s) 225. The wireless channel(s) 230 are depicted in FIG. 1 as communicating via the one or more network(s) 225, and via one or more direct wireless connection(s) 133. The wireless connection(s) 133 may include various low-energy protocols including, for example, Bluetooth®, BLE, Ultra Wide-Band (UWB), Near Field Communication (NFC) protocols, or other protocols.

The network(s) 225 illustrate an example of an example communication infrastructure in which the connected devices discussed in various embodiments of this disclosure may communicate. The network(s) 225 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The automotive computer 110 may be installed in an engine compartment of the vehicle 105 (or elsewhere in the vehicle 105) and operate as a functional part of the mobile device localization system 107, in accordance with the disclosure. The automotive computer 110 may include one or more processor(s) 250 and a computer-readable memory 255.

The one or more processor(s) 250 may be disposed in communication with one or more memory devices that communicate information with the respective computing systems (e.g., the memory 255 and/or one or more external databases not shown in FIG. 1). The processor(s) 250 may utilize the memory 255 to store programs in code and/or to store data for performing aspects in accordance with the disclosure. The memory 255 may be a non-transitory computer-readable memory storing a mobile device localization program code. The memory 255 can include any one or a combination of volatile memory elements (e.g., dynamic random-access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc).

The ECUs 217 may share a power bus 278 with the automotive computer 110, and may be configured to coordinate the data between vehicle systems, connected servers (e.g., the server(s) 270), and other vehicles (not shown in FIG. 1) operating as part of a vehicle fleet. The ECUs 217 can include or communicate with any combination of the VCU 265, such as, for example, a Body Control Module (BCM) 293, an Engine Control Module (ECM) 285, a Transmission Control Module (TCM) 290, the TCU 260, a Restraint Control Module (RCM) 287, etc. In some aspects, the VCU 265 may control aspects of the vehicle 105, and implement one or more instruction sets received from the application 235 operating on the mobile device 150, from one or more instruction sets received from the mobile device localization system 107, and/or from instructions received from an AV controller, such as an AV controller 300 discussed with respect to FIG. 3 hereafter.

The TCU 260 can be configured to provide vehicle connectivity to wireless computing systems onboard and offboard the vehicle 105, and may include a Navigation (NAV) receiver for receiving and processing a GPS signal from the GPS 275, the low-fidelity BLEM 115, a Wi-Fi transceiver, an Ultra-Wide Band (UWB) transceiver, and/or other wireless transceivers (not shown in FIG. 1) that may be configurable for wireless communication between the vehicle 105 and other systems, computers, and modules. The ECUs 217 may be disposed in communication with the VCU 265 by way of a bus 280. In some aspects, the TCU 260 may retrieve data and send data as a node in a CAN bus.

The low-fidelity BLEM 115 (hereafter "BLEM 115") may establish wireless communication using Bluetooth® and Bluetooth Low-Energy® communication protocols by broadcasting and/or listening for broadcasts of small advertising packets, and establishing connections with responsive devices that are configured according to embodiments described herein. For example, the BLEM 115 may include Generic Attribute Profile (GATT) device connectivity for client devices that respond to or initiate GATT commands and requests, and connect directly with the mobile device 150, and/or one or more keys (which may include, for example, the fob 155, the mobile device 150, etc.). The VCU 265 may be configured for safety processing (i.e. continuous intent motion) where the VCU 265 may override user localization to adhere to stopping distance requirements. The system 107 can manage the override by an interrupt to perform computations each time a new packet is received from the controlling remote device (e.g., the mobile device 150).

The bus 280 may be configured as a Controller Area Network (CAN) bus organized with a multi-master serial bus standard for connecting two or more of the VCU 265 as nodes using a message-based protocol that can be configured and/or programmed to allow the VCU 265 to communicate with each other. The bus 280 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus architecture. In some aspects, the VCU 265 may communicate with a host computer (e.g., the automotive computer 110, the mobile device localization system 107, and/or the server(s) 270, etc.), and may also communicate with one another without the necessity of a host computer. The bus 280 may connect the ECUs VCU 265 with the automotive computer 110 such that the automotive computer 110 may retrieve information from, send information to, and otherwise interact with the VCU 265 to perform steps described according to embodiments of the present disclosure. The bus 280 may connect CAN bus nodes (e.g., the VCU 265) to each other through a two-wire bus, which may be a twisted pair having a nominal characteristic impedance. The bus 280 may also be accomplished using other communication protocol solutions, such as Media Oriented Systems Transport (MOST) or Ethernet. In other aspects, the bus 280 may be a wireless intra-vehicle bus.

The VCU 265 may control various loads directly via the bus 280 communication or implement such control in conjunction with the BCM 293. The VCU 265 described with respect to the VCU 265 are provided for exemplary purposes only and are not intended to be limiting or exclusive. Control and/or communication with other control modules not shown in FIG. 1 is possible, and such control is contemplated.

In an example embodiment, the VCU 265 may control aspects of vehicle operation and communication using inputs from human drivers, inputs from an autonomous vehicle controller 300 (FIG. 3), the mobile device localization system 107, and/or via wireless signal inputs received via the wireless channel(s) 233 from other connected devices such as the mobile device 150, among others. The VCU 265, when configured as nodes in the bus 280, may each include a central processing unit (CPU), a CAN controller, and/or a transceiver (not shown in FIG. 1). For example, although the mobile device 150 is depicted in FIG. 2 as connecting to the vehicle 105 via the BLEM 115, it is contemplated that the wireless channel 233 may also or alternatively be established between the mobile device 150 and one or more of the VCU 265 via the respective transceiver(s) associated with the module(s).

The BCM 293 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 293 may also operate as a gateway for bus and network interfaces to interact with remote ECUs (not shown in FIG. 2).

The BCM 293 may coordinate any one or more functions from a wide range of vehicle functionality, including energy management systems, alarms, vehicle immobilizers, driver and rider access authorization systems, Phone-as-a-Key (PaaK) systems, driver assistance systems, AV control systems, power windows, doors, actuators, and other functionality, etc. The BCM 293 may be configured for vehicle energy management, exterior lighting control, wiper functionality, power window and door functionality, heating ventilation and air conditioning systems, and driver integration systems. In other aspects, the BCM 293 may control auxiliary equipment functionality, and/or be responsible for integration of such functionality.

The computing system architecture of the automotive computer 110, VCU 265, and/or the mobile device localization system 107 may omit certain computing modules. It should be readily understood that the computing environment depicted in FIG. 1 is one example of one possible implementation according to the present disclosure, and thus, it should not be considered limiting or exclusive.

Figure 3:
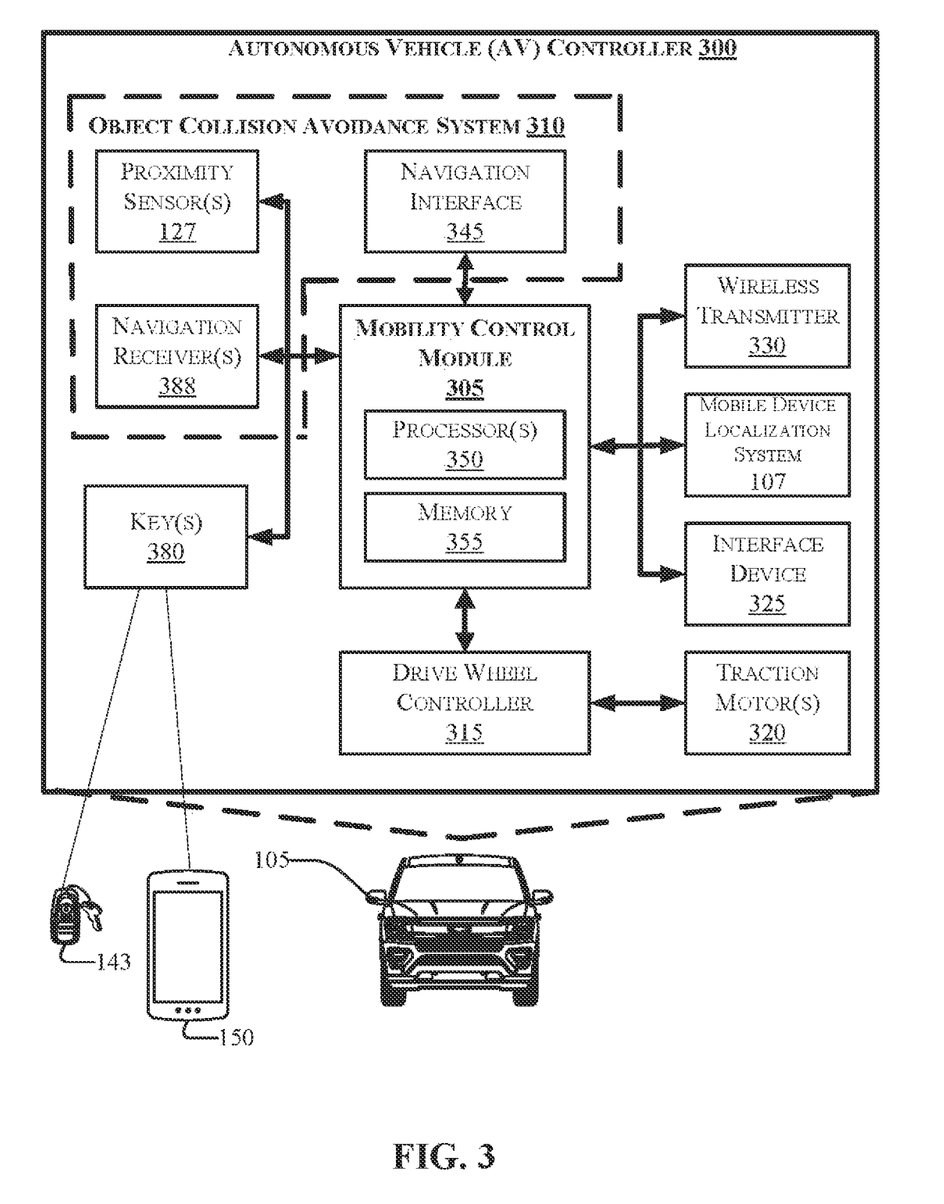
FIG. 3 depicts a block diagram of an example control system for an autonomous vehicle in accordance with the present disclosure.

FIG. 3 depicts a block diagram of an example AV controller 300 for an autonomous vehicle such as, for example, the vehicle depicted in FIGS. 1A-1C, and FIG. 2. The example navigation system 103 may include a mobility control module 305, which may be configured to receive data from an object collision avoidance system 310. The AV controller 300 may further include a drive wheel controller 315 in communication with the mobility control module 305 and one or more traction motor(s) 320 in communication with the drive wheel controller 315. An interface device 325 may be in communication with the object collision avoidance system 310. The object collision avoidance system 310 may communicate with one or more control signals to a mobile device application, such as, for example, the application 235 (depicted in FIG. 2) via the VCU 265 (FIG. 2), which may be in communication with the mobility control module 305.

The object collision avoidance system 310 may include one or more proximity sensor(s) 127, one or more navigation receiver(s), and a navigation interface 345 through which users of the vehicle 105 may determine a geographic position of a user and/or the mobile device 150 (e.g., the user 140 and the mobile device 150 as shown in FIGS. 1A-1C). The mobility control module 305 may communicate with the drive wheel controller 315 and transmit one or more signals for control of the one or more traction motor(s) 320. In an example embodiment, the mobility control module 305 may further include the key(s) 380, which may be configured to activate an operation of the vehicle 105. The key(s) 380 may include the mobile device 150 and/or the fob 143.

The key(s) 380 may be a physical key or may be an identification code or a password entered by a user via a touch screen interface (e.g., the interface device 325, the fob 143, or via an interface of the mobile device 150). The identification code may be associated with a service provider who rents a vehicle, an individual owner of the vehicle, a subscriber to multiple vehicles in a fleet associated with the service provider, etc. The identification code may further enable a user to navigate a specific geographic region authorized by the service provider. In other words, in some embodiments, vehicle 105 may be configured to operate within a geofenced area within in a specific geographic region, where the specific region is associated with the identification code.

The mobility control module 305 may include one or more processor(s) 350, and a memory 355. The processor(s) 350 may be one or more commercially available general-purpose processor(s), such as a processor from the Intel® or ARM® architecture families. In some aspects, the mobility control module 305 may be implemented in a system on a chip (SoC) configuration, to include other system components such as RAM, flash storage and I/O buses. Alternatively, mobility control module 305 can be implemented using purpose-built integrated circuits, or any other suitable technology now known or later developed. The mobility control module 305 also includes a memory unit.

The memory 355 may include executable instructions implementing the basic functionality of navigation system 103 and a database of locations in geographic area.

The object collision avoidance system 310 may provide route management and communication between one or more other vehicles in a vehicle fleet, and to the operator of the vehicle 105 (e.g., the user 140). The object collision avoidance system 310 may receive operator input via the navigation interface 345 to receive user selections while operating the vehicle. The mobility control module 305 may receive navigational data from the navigation receiver(s) 388 and the proximity sensor(s) 127, determine a navigational path from a first location to a second location, and provide instructions to the drive wheel controller 315 for autonomous, semi-autonomous, and/or manual operation.

The navigation receiver(s) 388 can include one or more of a global positioning system (GPS) receiver, and/or other related satellite navigation systems such as the global navigation satellite system (GLNSS), Galileo, or other similar systems known in the art of autonomous vehicle operation. Additionally, the navigation receiver(s) 388 can be configured to receive locally based navigation cues to aid in precise navigation through space-restricted areas, such as, for example, in a crowded street, and/or in a distributed beacon environment. When deployed in conjunction with a distributed beacon network (not shown), locally based navigation cues can include communication with one or more purpose-built location beacons (not shown) placed throughout a geographic area. The navigation cues may enable an increased level of navigation precision and provide specific indicators for locations of various points of interest. In other aspects, the navigation receiver(s) 388 may include one or more navigation transceivers (not shown) for communication with mobile network infrastructure for cell tower triangulation and use of known-location Wi-Fi hotspots. Any location technology now known or later developed that can provide a high precision location (e.g. preferably within a foot) can be useful as part of navigation receiver(s) 388.

The proximity sensor(s) 127 may work in connection with the navigation receiver(s) 388 to provide situational awareness to mobility control module 305 for autonomous navigation. For example, the proximity sensors may include one or more Radio Detection and Ranging (RADAR or "radar") sensor configured for detection and localization of objects using radio waves, a Light Detecting and Ranging (LiDAR or "lidar") sensor, a vision sensor system having trajectory, obstacle detection, object classification, augmented reality, and/or other capabilities, and/or the like. The proximity sensor(s) 127 may alert the mobility control module 305 to the presence of sensed obstacles and provide trajectory information to the mobility control module 305, where the trajectory information is indicative of moving objects or people that may interact with the vehicle 105. The trajectory information may include one or more of a relative distance, a trajectory, a speed, a size approximation, a weight approximation, and/or other information that may indicate physical characteristics of a physical object or person. The mobility control module 305 may be configured to aggregate information from navigation receiver(s) 388, such as current position and speed, along with sensed obstacles from the proximity sensor(s) 125, and interpret the aggregated information to compute a safe path towards a destination. Sensed obstacles can include other vehicles, pedestrians, animals, structures, curbs, and other random objects. In some implementations the proximity sensor(s) 125 may be configured to determine the lateral dimensions of the path upon which the vehicle 105 is traveling, e.g. determining relative distance from the side of a sidewalk or curb, to help aid mobility control module 305 in maintaining precise navigation on a particular path.

In some aspects, the proximity sensor(s) 127 may also perform low-fidelity positioning, according to embodiments of the present disclosure. In another embodiment, the proximity sensor(s) 127 may perform aspects of a high-fidelity PaaK localization system disposed with the VCU 265 (as shown in FIG. 2) to determine a high-fidelity starting point while the vehicle 105 is in a non-motive state (e.g., when the vehicle is in a key-on mode but static). In one aspect, a high-fidelity fixed point may be a fixed point or location from which the vehicle 105 can track user position. The lower-fidelity single-antenna (e.g., the BLEAM 117) may be used in other circumstances described herein.

The interface device 325 may include a touch screen interface surface configured to providing operational information such as power consumption information, battery health, battery level, etc. The interface device 325 may control other aspects of the autonomous vehicle 105, such as breaking, acceleration, etc., which may be in communication with the navigation interface 345, and/or be integral with the navigation interface 345 such that they share a common touch screen interface.

The wireless transmitter 330 may communicate with one or more other vehicles in a fleet (not shown) and/or with a central routing computer (e.g., the server(s) 270 as shown in FIG. 2) using a wireless communication network such as, for example, the network(s) 225. The wireless transmitter 330 may embody any known transmitter, using one or more vehicle-to-vehicle communication protocols. An example of a vehicle-to-vehicle communication protocol may be, for example, the dedicated short-range communication (DSRC) protocol.

The mobility control module 305 may connect with one or more drive wheel controller(s) 315, which in turn may operate one or more traction motors 320. The mobility control module 305 may communicate with the drive wheel controller(s) 315 for providing autonomous and/or semi-autonomous navigation.

The drive wheel controller 315 may control one or more drive mechanisms such as, for example, one or more brushless direct current (DC) motor, or another traction motor technology.

Figure 4:
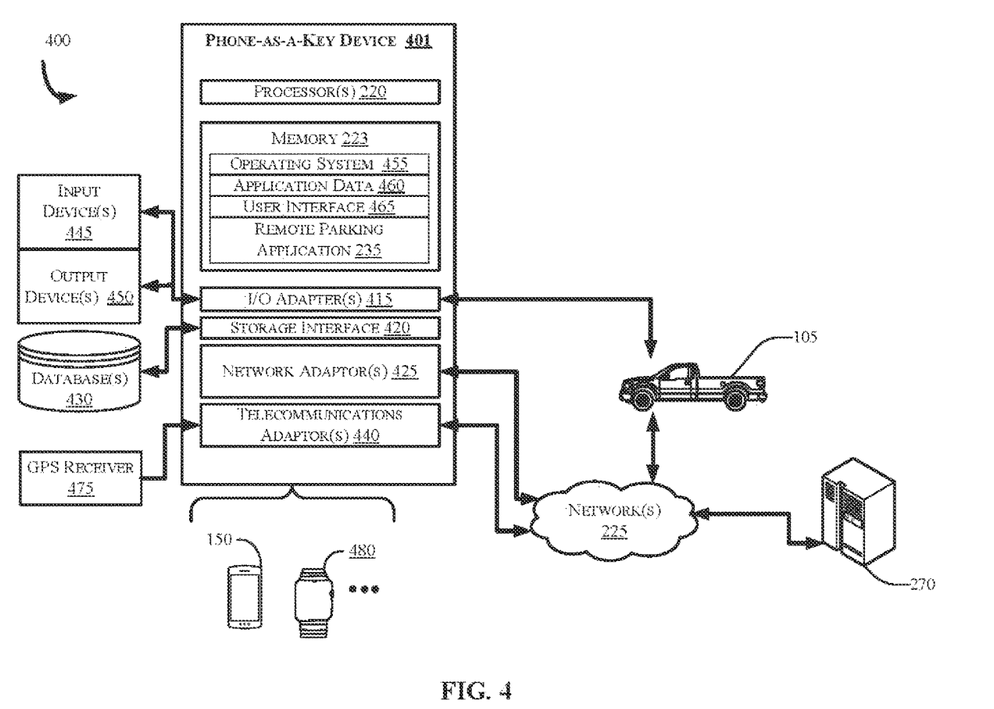
FIG. 4 illustrates a block diagram of an exemplary computing environment and computer system for use in practicing the embodiments described herein.

FIG. 4 illustrates a block diagram of an exemplary computing environment 400, which may include a mobile device 150 for use in practicing the embodiments described herein. The environment and system described herein can be implemented in hardware, software (e.g., firmware), or a combination thereof. The mobile device 150 may be representative of one or more of the computing systems depicted with respect to FIGS. 1A-1C and FIG. 2. For example, the mobile device 150 may be similar or identical to the mobile device 150, a smartwatch device 480, or another similarly configured device. The mobile device 150 may be implemented in a device that is separate from but communicatively coupled to one or more vehicle telematic devices such as the NAV 288 (FIG. 2) and/or the BLEM 115.

The mobile device 150 may include the one or more processor(s) 220, memory 223 communicatively coupled to the one or more processor(s) 220, and one or more input/output adaptors 415 that can communicatively connect with external devices such as, for example, input devices 445 and/or output devices 450. The I/O adapter(s) 415 may include, for example, a BLE adapter disposed in communication with the BLEM 115 (FIG. 2). The mobile device 150 may operatively connect to and communicate information with one or more internal and/or external memory devices such as, for example, one or more databases 430 via a storage interface 420. The mobile device 150 may also include one or more network adaptor(s) 425 enabled to communicatively connect the mobile device 150 with one or more network(s) 225. In one embodiment, the mobile device 150 can include one or more telecommunications network(s) for communication between the mobile device 150 and any external device. In such embodiments, the mobile device 150 can further include one or more telecommunications adaptor(s) 440.

The one or more processor(s) 220 collectively include a hardware device for executing program instructions (aka software), stored in a computer-readable memory (e.g., the memory 223). The one or more processor(s) 220 can be a custom made or commercially-available processor, a central processing unit (CPU), a plurality of CPUs, an auxiliary processor among several other processors associated with the mobile device 150, a semiconductor-based microprocessor (in the form of a microchip or chip set), or generally any device for executing instructions.

The one or more processor(s) 220 may be disposed in communication with one or more memory devices (e.g., the memory 223 and/or one or more external databases 430, etc.) via a storage interface 420. The storage interface 420 can also connect to one or more memory devices including, without limitation, one or more databases 430, and/or one or more other memory drives (not shown) including, for example, a removable disc drive, a vehicle computing system memory, cloud storage, etc., employing connection protocols such as serial advanced technology attachment (SATA), integrated drive electronics (IDE), universal serial bus (USB), fiber channel, small computer systems interface (SCSI), etc.

The memory 223 can include any one or a combination of volatile memory elements (e.g., dynamic random-access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc).

The instructions in the memory 223 can include one or more separate programs, each of which can include an ordered listing of computer-executable instructions for implementing logical functions. In the example of FIG. 4, the instructions in the memory 223 can include an operating system 455. The operating system 455 can control the execution of other computer programs such as, for example the remote parking application 235, and provide scheduling, input-output control, file and data management, memory management, and communication control and related services.

The program instructions stored in the memory 223 can further include application data 460, and instructions for controlling and/or interacting with the vehicle 105 through a user interface 465.

The user interface 465 may be configured to receive an output request message from the vehicle 105, causing the Mobile device 150 to output a user action message (not shown). Outputting the request message may be responsive to the vehicle 105 determining that the Phone-as-a Key device 401, and/or the user attempting to establish or maintain motive control of the vehicle 105, is not present in the high-fidelity zone 135 (or more particularly, within the high fidelity zone interior portion 137 as shown in FIGS. 1A and 1B). The user interface 465 may present the user action message via a touchscreen or other type of output display, where the user action message requests that the user perform some action to show that the user has proximity to the vehicle 105 such that the vehicle 105 may be operated in a safe fashion and the user 140 can re-establish vehicle control if a situation requires intervening actions by the user.

The I/O adaptor 415 can connect a plurality of input devices 445 to the mobile device 150. The input devices can include, for example, a keyboard, a mouse, a joystick, a microphone, a sensor, etc. The input device(s) 445 may also include one or more virtual keyboard(s) on a touchscreen interface, or another conventional input device.

The I/O adaptor 415 can also connect a plurality of output device(s) 450, which can include, for example, a display, a speaker, a touchscreen, etc. Other output devices can also be included, although not shown.

Finally, the I/O devices 445 and 450 that may be connectable to the I/O adaptor 415 can further include devices that communicate both inputs and outputs, for instance but are not limited to, a network interface chip or modulator/demodulator (for accessing other files, devices, systems, or a network), a Radio Frequency (RF) or other transceiver, a Near Field Communication (NFC) device, a BLE receiver, an ad-hoc networking device, a bridge, a router, etc.

According to some example embodiments, the mobile device 150 can include one or more telecommunications adaptor(s) 440 that may be disposed in communication with mobile telecommunications infrastructure such as, for example, mobile phone towers, satellites, vehicle-to-vehicle network infrastructure, etc. The telecommunications adaptor(s) 440 can also include and/or be disposed in communication with or more other adaptors configured to transmit and/or receive cellular, mobile, and/or other communications protocols for wireless communication. The telecommunications adaptor(s) 440 can also include and/or be disposed in communication with a global positioning system (GPS) receiver 275.

In some embodiments, the communications adaptor 416 may couple the mobile device 150 to one or more network(s) 225. The mobile device 150 may transmit and receive data between the network(s) 225 and devices and/or systems external to the mobile device 150.

Figure 5:
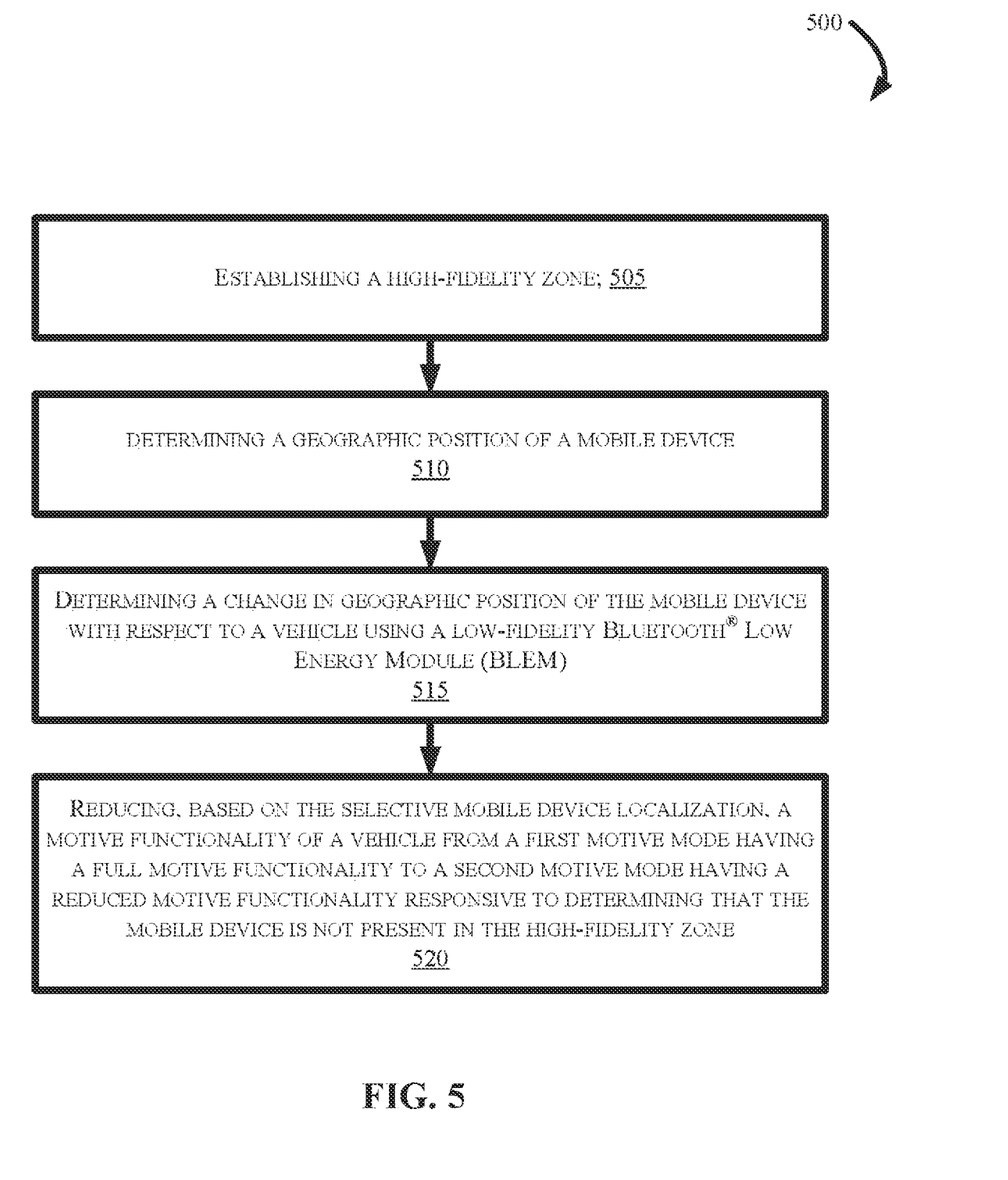
FIG. 5 depicts a flow diagram for a method of performing a selective mobile device localization in accordance with the present disclosure.

FIG. 5 is a flow diagram of an example method 500 for performing a selective mobile device localization, according to the present disclosure. FIG. 4 may be described with continued reference to prior figures, including FIGS. 1A, 1B, 2, and FIG. 3. The following process is exemplary and not confined to the steps described hereafter. Moreover, alternative embodiments may include more or less steps that are shown or described herein and may include these steps in a different order than the order described in the following example embodiments.

With reference to FIG. 5, at step 505, the method 500 may commence with establishing a high-fidelity zone. This step may include defining a geo-fence perimeter surrounding the vehicle that defines an interior portion of the high-fidelity zone.

Next, the method 500 includes a step 510 of determining a geographic position of a mobile device. Determining the geographic position of the mobile device can include determining the geographic position of the mobile device via a high-fidelity Phone-as-a-Key (PaaK) localization system disposed with a vehicle controller of a vehicle.

At step 515, the method 500 may include determining a change in geographic position of the mobile device with respect to a vehicle using a low-fidelity Bluetooth® Low Energy Module (BLEM). In one aspect, the low-fidelity BLEM includes a single antenna. This step may further include determining that the mobile device is not present in the high-fidelity zone, and sending, to the mobile device, an output request message causing the mobile device to output a user action message responsive to determining that the mobile device is not present in the high-fidelity zone.

In other aspects, this step may include generating output instructions causing the mobile device to output a user prompt on a display of the mobile device, where the user action includes walking toward the high-fidelity zone. The output instructions may be sent to the mobile device responsive to reducing the motive functionality of the vehicle from the first motive mode to the second motive mode.

At step 520, the method 500 can include reducing, based on the selective mobile device localization, a motive functionality of a vehicle from a first motive mode having a full motive functionality to a second motive mode having a reduced motive functionality responsive to determining that the mobile device is not present in the high-fidelity zone. Reducing the motive functionality to the second motive mode may be further based on determining that a fob is not present in the high-fidelity zone. Responsive to determining that a key fob is present in the high-fidelity zone, the method may include increasing the motive functionality to the first motive mode responsive to determining that the key fob is present in the high-fidelity zone. In one embodiment, the second motive mode may cause the processor of the automotive computer to operate at a reduced processing speed having a slower processing speed than the first motive mode.

Similarly, a non-motive functionality of the vehicle may be increased from a first non-motive mode having no (or limited) non-motive functionality to a second motive mode having increased motive functionality, responsive to determining that the mobile device is present in the high-fidelity zone interior portion 137. A non-motive functionality (also referred to herein as a non-motive "state," "feature," etc.) may refer to a state when the vehicle is keyed-on and running but vehicle is static.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In summary, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for performing a selective mobile device localization comprising:
   establishing a high-fidelity zone;
   determining a first geographic position of a mobile device at a first time via a high-fidelity Phone-as-a-Key (PaaK) localization system associated with a vehicle;
   responsive to the determination of the first geographic position of the mobile device, switching to a low-fidelity radio frequency module for tracking changes in geographic position of the mobile device;

determining a second geographic position of the mobile device at a second time after the first time via the low-fidelity radio frequency module, wherein the second geographic position is inside the high-fidelity zone; and increasing, based on the second geographic position indicating that the mobile device is inside the high-fidelity zone, a non-motive functionality of the vehicle from a first non-motive mode to a second non-motive mode having an increased non-motive functionality.

2. The method according to claim 1, further comprising:
determining a third geographic position of the mobile device at a third time after the second time via the low-fidelity radio frequency module, wherein the third geographic position is inside a cabin of the vehicle; and
increasing, based on the third geographic position indicating that the mobile device is inside the cabin of the vehicle, a non-motive functionality of the vehicle from the second non-motive mode to a third non-motive mode having an increased non-motive functionality from the second non-motive mode.

3. The method according to claim 1, wherein the low-fidelity radio frequency module comprises a single antenna.

4. The method according to claim 1, wherein establishing the high-fidelity zone comprises:
defining a geo-fence perimeter surrounding the vehicle that defines an interior portion of the high-fidelity zone.

5. The method according to claim 1, further comprising:
determining that the mobile device is not present in the high-fidelity zone; and
sending, to the mobile device, an output request message causing the mobile device to output a user action message responsive to determining that the mobile device is not present in the high-fidelity zone.

6. The method according to claim 1, wherein increasing the non-motive functionality to the second non-motive mode is further based on determining that a mobile device is present in the high-fidelity zone.

7. The method according to claim 1, further comprising:
determining that a mobile device is outside of the high-fidelity zone; and
decreasing the non-motive functionality responsive to determining that the mobile device is outside of the high-fidelity zone.

8. The method according to claim 1, further comprising:
sending a message to the mobile device requesting a user action responsive to increasing the non-motive functionality of the vehicle from the first non-motive mode to the second non-motive mode.

9. The method according to claim 8, wherein sending the message requesting the user action comprises:
generating output instructions causing the mobile device to output a user prompt on a display of the mobile device, wherein the user action comprises walking toward the high-fidelity zone.

10. The method according to claim 1, wherein the second non-motive mode comprises an increased processing speed having a greater processing speed than the first non-motive mode.

11. A system for a vehicle, comprising:
a processor;
a low-energy communication protocol disposed in communication with the processor; and
a memory for storing executable instructions, the processor configured to execute instructions to perform a selective mobile device localization for a mobile device, the instructions causing the processor to:
establish a high-fidelity zone;
determine a first geographic position of a mobile device at a first time via a high-fidelity Phone-as-a-Key (PaaK) localization system associated with a vehicle;
responsive to the determination of the first geographic position of the mobile device, switch to a low-fidelity radio frequency module for tracking changes in geographic position of the mobile device;
determine a second geographic position of the mobile device at a second time after the first time via the low-fidelity radio frequency module, wherein the second geographic position is inside the high-fidelity zone; and
increase, based on the second geographic position indicating that the mobile device is inside the high-fidelity zone, a non-motive functionality of the vehicle from a first non-motive mode to a second non-motive mode having an increased non-motive functionality.

12. The system according to claim 11, wherein the processor is further configured to:
determining a third geographic position of the mobile device at a third time after the second time via the low-fidelity radio frequency module, wherein the third geographic position is inside a cabin of the vehicle; and
increasing, based on the third geographic position indicating that the mobile device is inside the cabin of the vehicle, a non-motive functionality of the vehicle from the second non-motive mode to a third non-motive mode having an increased non-motive functionality from the second non-motive mode.

13. The system according to claim 11, wherein the low-energy communication protocol comprises a single antenna.

14. The system according to claim 11, wherein the processor is further configured to:
generate a geo-fence perimeter surrounding the vehicle that defines an interior portion of the high-fidelity zone.

15. The system according to claim 11, wherein the processor is further configured to execute the instructions to:
determine that the mobile device is not present in the high-fidelity zone; and
send, to the mobile device, an output request message causing the mobile device to output a user action message responsive to determining that the mobile device is not present in the high-fidelity zone.

16. The system according to claim 11, wherein the processor is further configured to execute the instructions to:
increase the non-motive functionality to the second non-motive mode is further based on determining that a mobile device is present in the high-fidelity zone.

17. The system according to claim 11, wherein the processor is further configured to execute the instructions to:
determine that a mobile device is out of the high-fidelity zone; and
decrease the non-motive functionality responsive to determining that the mobile device is outside of the high-fidelity zone.

18. The system according to claim 11, wherein the processor is further configured to execute the instructions to:
send a message to the mobile device requesting a user action responsive to increasing the non-motive functionality of the vehicle from the first non-motive mode to the second non-motive mode.

19. The system according to claim 18, wherein the processor is further configured to execute the instructions to:

generate output instructions causing the mobile device to output a user prompt on a display of the mobile device, wherein the user action comprises walking toward the high-fidelity zone.

20. A non-transitory computer-readable storage medium in a vehicle control module, the storage medium having instructions stored thereupon which, when executed by the vehicle control module, cause the vehicle control module to:

establish a high-fidelity zone;

determine a first geographic position of a mobile device at a first time via a high-fidelity Phone-as-a-Key (PaaK) localization system associated with a vehicle;

responsive to the determination of the first geographic position of the mobile device, switch to a low-fidelity radio frequency module for tracking changes in geographic position of the mobile device;

determine a second geographic position of the mobile device at a second time after the first time via the low-fidelity radio frequency module, wherein the second geographic position is inside the high-fidelity zone; and increase, based on the second geographic position indicating that the mobile device is inside the high-fidelity zone, a non-motive functionality of the vehicle from a first non-motive mode having a to a second non-motive mode having an increased non-motive functionality.

\* \* \* \* \*